(12) United States Patent
Schoening et al.

(10) Patent No.: US 9,977,479 B2
(45) Date of Patent: May 22, 2018

(54) SYSTEM AND METHOD FOR NETWORK ENABLED WAKE FOR NETWORKS

(71) Applicant: CISCO TECHNOLOGY, INC., San Jose, CA (US)

(72) Inventors: Charles B. Schoening, Little Silver, NJ (US); John D. Parello, Campbell, CA (US); Tirthankar Ghose, San Ramon, CA (US); Rachel Ross, Austin, TX (US); Amber Imam, Castro Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 114 days.

(21) Appl. No.: 14/579,854

(22) Filed: Dec. 22, 2014

(65) Prior Publication Data

US 2015/0113299 A1 Apr. 23, 2015

Related U.S. Application Data

(63) Continuation of application No. 13/302,544, filed on Nov. 22, 2011, now abandoned.

(51) Int. Cl.
*G06F 1/00* (2006.01)
*G06F 1/32* (2006.01)

(52) U.S. Cl.
CPC .................. *G06F 1/3209* (2013.01)

(58) Field of Classification Search
CPC ........ G06F 1/26; G06F 1/3203; G06F 1/3234; G06F 1/3293; G06F 1/3287; Y02B 60/1285; Y02B 60/1289; Y02B 60/1282

USPC .................................................. 713/310, 324
See application file for complete search history.

(56) References Cited

U.S. PATENT DOCUMENTS

| | | | |
|---|---|---|---|
| 4,785,927 A | | 11/1988 | Dobbins |
| 5,991,830 A | * | 11/1999 | Beard ................. G06F 12/0684 710/18 |
| 6,255,943 B1 | * | 7/2001 | Lewis ................... H04L 41/042 340/506 |
| 6,269,343 B1 | | 7/2001 | Pallakoff |
| 6,415,270 B1 | | 7/2002 | Rackson et al. |
| 6,618,709 B1 | | 9/2003 | Sneeringer |
| 6,681,156 B1 | | 1/2004 | Weiss |
| 6,686,709 B2 | | 2/2004 | Lee et al. |
| 6,785,592 B1 | | 8/2004 | Smith et al. |
| 6,930,947 B2 | | 8/2005 | Chen |
| 6,980,526 B2 | | 12/2005 | Jang et al. |

(Continued)

FOREIGN PATENT DOCUMENTS

WO WO2013/025267 2/2013

OTHER PUBLICATIONS

"Cisco Energywise"; Cisco Systems; Feb. 1, 2009; archived from http://www.archive.org; pp. 1-6.

(Continued)

*Primary Examiner* — Faisal M Zaman (57) ABSTRACT

A method is provided in one example embodiment and includes receiving a message at a network element configured for routing packets, where the message directs a network device to change its power state; identifying the network device as being associated with a network for which the network element has responsibility; and communicating at least a portion of the message from the network element to the network device.

20 Claims, 6 Drawing Sheets

(56) References Cited

U.S. PATENT DOCUMENTS

| | | | |
|---|---|---|---|
| 7,084,752 B2 | 8/2006 | Parello et al. | |
| 7,177,728 B2 | 2/2007 | Gardner | |
| 7,188,260 B1 | 3/2007 | Shaffer et al. | |
| 7,203,849 B2 | 4/2007 | Dove | |
| 7,263,450 B2 | 8/2007 | Hunter | |
| 7,324,518 B2 | 1/2008 | Dai et al. | |
| 7,337,336 B2 | 2/2008 | Ferentz et al. | |
| 7,345,998 B2 * | 3/2008 | Cregg | H04B 3/542 370/230 |
| 7,366,933 B1 | 4/2008 | Aharonian et al. | |
| 7,392,407 B2 | 6/2008 | Jonnala et al. | |
| 7,698,580 B2 | 4/2010 | Schindler et al. | |
| 7,734,572 B2 | 6/2010 | Wiemeyer et al. | |
| 7,908,501 B2 | 3/2011 | Kim et al. | |
| 7,921,306 B2 | 4/2011 | Dove | |
| 7,941,677 B2 | 5/2011 | Penning | |
| 7,966,502 B2 | 6/2011 | Diab et al. | |
| 7,974,298 B2 | 7/2011 | Baird et al. | |
| 8,160,753 B2 | 4/2012 | Ferentz et al. | |
| 8,225,124 B2 | 7/2012 | Geiger et al. | |
| 8,250,381 B2 | 8/2012 | Hansalia et al. | |
| 8,261,104 B2 | 9/2012 | Landry et al. | |
| 8,301,918 B2 | 10/2012 | Diab et al. | |
| 8,352,754 B2 | 1/2013 | Chin | |
| 8,352,769 B1 | 1/2013 | Ghose et al. | |
| 8,407,332 B1 | 3/2013 | Kralpak et al. | |
| 8,732,501 B1 | 5/2014 | Ghose et al. | |
| 8,745,429 B2 | 6/2014 | Ghose et al. | |
| 8,760,280 B2 * | 6/2014 | Piccolo, III | G08B 17/00 307/117 |
| 8,849,473 B2 | 8/2014 | Claise et al. | |
| 8,996,900 B2 | 3/2015 | Vetteth | |
| 9,026,812 B2 | 5/2015 | Mohan et al. | |
| 9,058,167 B2 | 6/2015 | Ver Steeg | |
| 2002/0016639 A1 | 2/2002 | Smith et al. | |
| 2002/0040475 A1 | 4/2002 | Yap et al. | |
| 2002/0157030 A1 | 10/2002 | Barker et al. | |
| 2003/0040812 A1 * | 2/2003 | Gonzales | H04L 12/2803 700/19 |
| 2003/0052180 A1 | 3/2003 | Huhn et al. | |
| 2003/0074088 A1 * | 4/2003 | Gonzales | G05B 19/042 700/19 |
| 2003/0120959 A1 | 6/2003 | Bohrer | |
| 2004/0148388 A1 | 7/2004 | Chung et al. | |
| 2004/0203615 A1 * | 10/2004 | Qu | H04M 1/663 455/412.1 |
| 2005/0055589 A1 | 3/2005 | Kojo | |
| 2005/0123109 A1 | 6/2005 | Yamagishi et al. | |
| 2005/0243861 A1 | 11/2005 | Elkayam et al. | |
| 2006/0053324 A1 | 3/2006 | Giat et al. | |
| 2006/0056397 A1 | 3/2006 | Aizu et al. | |
| 2006/0072531 A1 | 4/2006 | Ewing et al. | |
| 2006/0184694 A1 | 8/2006 | Monette et al. | |
| 2007/0014268 A1 | 1/2007 | Kim et al. | |
| 2007/0024239 A1 | 2/2007 | Park | |
| 2007/0043477 A1 | 2/2007 | Ehlers et al. | |
| 2007/0050818 A1 | 3/2007 | Berger et al. | |
| 2007/0070998 A1 | 3/2007 | Sethuram et al. | |
| 2007/0135086 A1 | 6/2007 | Stanford | |
| 2007/0143637 A1 | 6/2007 | Tsai | |
| 2007/0189257 A1 | 8/2007 | Suzuki et al. | |
| 2007/0214473 A1 | 9/2007 | Barton et al. | |
| 2007/0276547 A1 | 11/2007 | Miller | |
| 2008/0001584 A1 | 1/2008 | Chen | |
| 2008/0037999 A1 | 2/2008 | Masuda | |
| 2008/0052546 A1 | 2/2008 | Schindler et al. | |
| 2008/0062960 A1 | 3/2008 | Chen et al. | |
| 2008/0063381 A1 | 3/2008 | Conroy et al. | |
| 2008/0168283 A1 | 7/2008 | Penning | |
| 2008/0178232 A1 | 7/2008 | Velusamy | |
| 2008/0215899 A1 | 9/2008 | Jonnala et al. | |
| 2008/0215902 A1 | 9/2008 | Jonnala et al. | |
| 2008/0225841 A1 | 9/2008 | Conway et al. | |
| 2008/0244282 A1 | 10/2008 | Hansalia et al. | |
| 2008/0256371 A1 | 10/2008 | Diab et al. | |
| 2008/0263191 A1 * | 10/2008 | Shah | H04L 43/028 709/223 |
| 2008/0272741 A1 | 11/2008 | Kanamori | |
| 2008/0301322 A1 | 12/2008 | Horibe | |
| 2008/0303486 A1 | 12/2008 | Kao | |
| 2009/0049315 A1 | 2/2009 | Diab et al. | |
| 2009/0070603 A1 | 3/2009 | Diab et al. | |
| 2009/0083167 A1 | 3/2009 | Subbloie | |
| 2009/0182834 A1 | 7/2009 | Zettler et al. | |
| 2009/0195349 A1 | 8/2009 | Frader-Thompson | |
| 2009/0196281 A1 | 8/2009 | Kouchri | |
| 2009/0217063 A1 | 8/2009 | Tomita | |
| 2009/0217188 A1 | 8/2009 | Alexander et al. | |
| 2009/0228723 A1 | 9/2009 | Yoshizaki | |
| 2009/0229288 A1 | 9/2009 | Alston et al. | |
| 2009/0249091 A1 | 10/2009 | Goodnow | |
| 2009/0263127 A1 | 10/2009 | Haran et al. | |
| 2009/0282277 A1 | 11/2009 | Sedarat et al. | |
| 2009/0310607 A1 | 12/2009 | Evans | |
| 2010/0043067 A1 * | 2/2010 | Varadhan | H04L 12/18 726/13 |
| 2010/0052421 A1 | 3/2010 | Schindler et al. | |
| 2010/0070217 A1 | 3/2010 | Shimada et al. | |
| 2010/0080111 A1 | 4/2010 | Diab et al. | |
| 2010/0111523 A1 | 5/2010 | Hirth et al. | |
| 2010/0145542 A1 | 6/2010 | Chapel et al. | |
| 2010/0162294 A1 | 6/2010 | Yin et al. | |
| 2010/0162305 A1 | 6/2010 | Downey et al. | |
| 2010/0172628 A1 | 7/2010 | Berger et al. | |
| 2010/0205466 A1 | 8/2010 | Diab et al. | |
| 2010/0235868 A1 | 9/2010 | Howarter et al. | |
| 2010/0241880 A1 | 9/2010 | Wertheimer et al. | |
| 2010/0247068 A1 | 9/2010 | Howarter et al. | |
| 2010/0309904 A1 | 12/2010 | Couse | |
| 2010/0322078 A1 | 12/2010 | Wang et al. | |
| 2010/0329108 A1 | 12/2010 | Diab et al. | |
| 2011/0022699 A1 | 1/2011 | Powell et al. | |
| 2011/0029796 A1 | 2/2011 | Matthews et al. | |
| 2011/0067048 A1 | 3/2011 | Barton et al. | |
| 2011/0072286 A1 | 3/2011 | Graham | |
| 2011/0125337 A1 | 5/2011 | Zavadsky | |
| 2011/0131428 A1 | 6/2011 | Diab et al. | |
| 2011/0131438 A1 | 6/2011 | Levitan | |
| 2011/0157939 A1 | 6/2011 | Wang | |
| 2011/0191608 A1 | 8/2011 | Vetteth | |
| 2011/0199046 A1 | 8/2011 | Tsai | |
| 2011/0239019 A1 | 9/2011 | Johnston | |
| 2011/0246797 A1 | 10/2011 | Diab et al. | |
| 2011/0320833 A1 | 12/2011 | Mohan et al. | |
| 2012/0045210 A1 | 2/2012 | Kim et al. | |
| 2012/0091804 A1 | 4/2012 | Altonen et al. | |
| 2012/0095610 A1 | 4/2012 | Chapel et al. | |
| 2012/0120958 A1 | 5/2012 | Mahadevan et al. | |
| 2012/0131369 A1 | 5/2012 | Paljug | |
| 2012/0190390 A1 * | 7/2012 | Reunamaki | H04W 52/0229 455/500 |
| 2012/0213085 A1 | 8/2012 | Koren et al. | |
| 2012/0226918 A1 | 9/2012 | Rallo | |
| 2012/0233478 A1 | 9/2012 | Mucignat et al. | |
| 2012/0259474 A1 | 10/2012 | Razum et al. | |
| 2012/0284537 A1 | 11/2012 | Kruglick | |
| 2013/0061076 A1 | 3/2013 | VerSteeg et al. | |
| 2013/0132745 A1 | 5/2013 | Schoening et al. | |
| 2013/0219197 A1 | 8/2013 | Lee et al. | |
| 2013/0303202 A1 | 11/2013 | Jafarian et al. | |
| 2013/0332001 A1 | 12/2013 | Parello et al. | |

OTHER PUBLICATIONS

"IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications Amendment: Data Terminal Equipment (DTE) Power via Media Dependent Interface (MDI)," © 2003 IEEE, Jun. 18, 2003, 121 pages.

(56) References Cited

OTHER PUBLICATIONS

Bennett, Mike, "IEEE 802.3az Energy Efficient Ethernet," Task Force Update, Presented to the P802.3ba Task Force, Denver, CO; Jul. 16, 2008; 17 pages http://www.ieee802.org/3/az/public/jul08/bennett_03_0708.pdf.
Claise, Benoit, et al., "Energy Management (eman): Description of Working Group," retrieved and printed on Aug. 17, 2011, 3 pages http://datatracker.ietf.org/wg/eman/charter/.
"Data Link Layer," Wikipedia, Jun. 28, 2014, 7 pages http://en.wikipedia.org/wiki/Data_link_layer.
"Link Layer Discovery Protocol," Wikipedia, Mar. 28, 2014, 4 pages http://en.wikipedia.org/wiki/Link_Layer_Discovery_Protocol.
Haran, Onn, "Applicability of EEE to Fiber PHYs," IEEE 8.02.3 EEE Meeting; Sep. 2007, Seoul, Korea; http://www.ieee802.org/3/eee_study/public/sep07/haran_1_0907.pdf; 12 pages.
Nordman, Bruce, "Energy Efficient Ethernet: Outstanding Questions," Mar. 12, 2007; 3 pages http://grouper.ieee.org/groups/802/3/eee_study/public/mar07/nordman2_01_0307.pdf.
Nordman, Bruce, et al., "Energy Efficiency and Regulation," IEEE 802 Tutorial; Jul. 13, 2009; 58 pages.
PCT Sep. 5, 2012 International Search Report and Written Opinion from International Application Serial No. PCT/US12/37359 10 pages.
Smart Board™, "Interactive Whiteboard," Sep. 2005; © 2005 SMART Technologies, Inc.; 2 pages.
"Wake on Local Area Network (LAN)," EnergyStar Products, Energy Star; [printed on Nov. 16, 2011]; 4 pages http://www.energystar.gov/index.cfm?c=power_mgt.pr_power_mgt_wol.
Wertheimer, Aviad and Eric Mann, "Active/Idle Toggling with Low-Power Idle," IEEE 802.3az Jan. 2008 Interim Meeting; 15 pages.
Jetzt, et al., LLDP/LLDP-MED Proposal for PoE Plus,; PoE Plus Task Force, Sep. 15, 2006, Knoxville, TN; 15 pages.
Wertheimer, et al., "Capabilities Negotiation Proposal for Energy-Efficient Ethernet," IEEE 802.3az, May 2008, pp. 1-18.
PCT Feb. 18, 2014 International Preliminary Report on Patentability from International Application Serial No. PCT/US12/37359 7 pages.
"MAC Address Definition," The Linux Information Project, Sep. 15, 2005 http://www.info.org.mac_address.html.
USPTO Nov. 10, 2014 Non-Final Offce Action from U.S. Appl. No. 13/492,617.
USPTO Feb. 27, 2015 Final Office Action from U.S. Appl. No. 13/492,617.
USPTO Jul. 17, 2015 Non-Final Office Action from U.S. Appl. No. 13/492,617.

\* cited by examiner

SYSTEM AND METHOD FOR NETWORK ENABLED WAKE FOR NETWORKS

RELATED APPLICATION

This Application is a continuation (and claims the benefit of priority under 35 U.S.C. § 120) of U.S. application Ser. No. 13/302,544, filed Nov. 22, 2011, entitled "SYSTEM AND METHOD FOR NETWORK ENABLED WAKE FOR NETWORKS," Inventors Charles B. Schoening, et al. The disclosure of the prior application is considered part of (and is incorporated by reference in) the disclosure of this application.

TECHNICAL FIELD

This disclosure relates in general to the field of communications and, more particularly, to a system and a method for network enabled wake for networks.

BACKGROUND

Energy consumption has become a preeminent concern for industrialized societies. Both consumers and businesses have become aware of their energy usage. Whether motivated by altruistic reasons, or by profitability concerns, individuals have come to terms with the notion that energy is a finite commodity: a commodity having accompanying costs that should be managed. Administrators now focus on power usage and, more specifically, on how to reduce those expenditures. In recent times, device manufacturers have added instrumentation and features in the network to quell these concerns. As network systems have become more sophisticated, while energy demands have continued to increase, architectures often fail in matching network capabilities with more intelligent energy consumption.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a message at a network element configured for routing packets. The message directs a network device to change its power state. The method also includes identifying the network device as being associated with a network for which the network element has responsibility, and communicating at least a portion of the message from the network element to the network device.

In more specific implementations, an application program interface (API) is leveraged in order to communicate the portion of the message, which identifies a media access control (MAC) address associated with the network device. In yet other embodiments, the message includes filter criteria to be used to identify the network device. In addition, the method may include searching a selection criteria database to identify the network device identified by the filter criteria. In more specific implementations, the filter criteria is used to identify a group of network devices for which a subsequent message for changing power states is intended. The network device can be part of a subnet associated with the network element.

Example Embodiments

Figure 1:
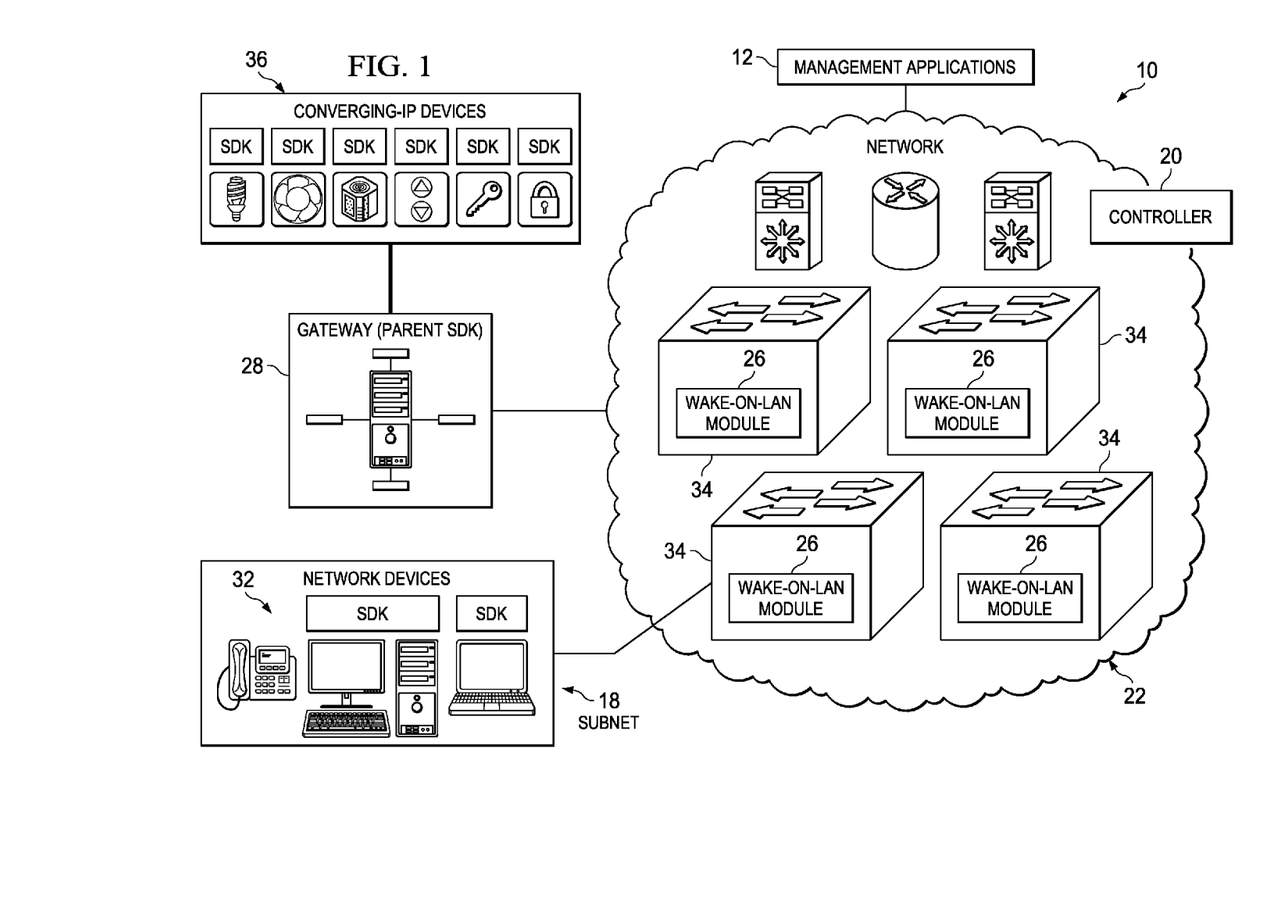
FIG. 1 is a simplified block diagram of an energy management system in accordance with one embodiment of the present disclosure.

FIG. 1 is a simplified block diagram of an energy management system 10 in accordance with one example implementation of the present disclosure. FIG. 1 includes a subnet 18, which can include any number of network devices 32. Subnet 18 is typically a logically visible subdivision of an internet protocol (IP) network; however, subnet 18 can be any network that allows a switch to communicate with, control, and/or manage network devices 32 in subnet 18. A controller 20 can be provisioned in a network 22 in order to execute certain power management activities discussed herein. A number of switches 34 are also provisioned in network 22. In certain implementations, each switch 34 may contain a wake-on-local area network (LAN) module 26. Wake-on-LAN module 26 can be configured to send change power state requests to network devices 32 at appropriate times. Additionally, a gateway 28 may be provisioned in network 22 such that it can interface with converging-IP devices 36, as is being illustrated in FIG. 1.

In this particular implementation of FIG. 1, the infrastructure of subnet 18 can interact with a number of network devices 32 (e.g., personal computers (PCs), building controllers, wireless devices, telephones, lighting fixtures, HVAC systems, video devices (e.g., Telepresence systems), etc). Certain network devices 32 may be associated with IP devices having corresponding Software Development Kit (SDK) elements. Similarly, gateway 28 may operate as a parent SDK for its child endpoints (e.g., a plurality of converging-IP devices 36). Subnet 18 is also coupled to a set of power management applications 12, which may include elements such as a LAN management element, etc. Management applications 12 can operate to intelligently control (directly or indirectly) any of the devices of FIG. 1.

In general terms, energy management system 10 is configured to measure and monitor power for network devices 32 (e.g., phones, AP's, PCs, building systems, etc.) and, further, provide command and control for network devices 32. The activities of energy management system 10 may include communicating messages to individual network devices 32 for shifting from one power state to a different power state (e.g., shifting from a normal operating state to a hibernation state), as further detailed below.

In operation, energy management system 10 provides a mechanism that understands the power consumption characteristics of network devices 32 for which it has responsibility. This can include understanding which network devices 32 can shift from one power state (e.g., a normal operating state) to a different power state (e.g., a hibernation, sleep mode, or shut down state). Additionally, the architecture is configured to query for power information using the network and, furthermore, implement time-of-day policies to control network devices 32. In essence, the network can operate as a control plane for controlling the energy consumption/usage for one or more network devices 32 within subnet 18. In this sense, the network serves as a platform for intelligent energy control. From a practical perspective, the smart loading capabilities of the architecture allow for a tangible cost savings for an associated enterprise.

For purposes of illustrating certain example techniques of energy management system 10, it is important to understand how energy management system 10 provides command and control functions for network devices 32. The infrastructure of subnet 18 can interact with a number of network devices 32 (e.g., a local storage module, personal computers (PCs), building controllers, wireless devices, telephones, lighting fixtures, HVAC systems, video devices (e.g., Telepresence systems), etc.). The wake-on-LAN technology of energy management system 10 can enable network devices 32 to be remotely awaken from a hibernating or sleep state. In one particular instance, the wake-on-LAN mechanism uses a management station to broadcast a "magic packet" containing a media access control (MAC) address of a target network device 32. The terms wake-on-LAN, wake-on-LAN technology, wake-on-LAN requests, etc. generally refer to any suitable request for the transition of a device from one power state to a different power state. A network card on a wake-on-LAN enabled network device 32 is kept powered so when the network card sees its MAC address contained in a wake-on-LAN message, the network card initiates a power-up of the network device. However, the broadcast mechanism of directing wake-on-LAN requests can be difficult to deploy in an enterprise network because security policies in routers typically drop subnet directed broadcasts, thus preventing wake-on-LAN messages from being received. For this reason, wake-on-LAN is often restricted to working on local area networks instead of working on other networks (e.g., an enterprise wide area network (WAN)).

In one particular example involving the use of a proxy model, the wake-on-LAN feature may be provided in enterprise WAN networks. In such an example, one or more network devices 32 in a subnet can remain powered on and run a special software agent, which is used to locally broadcast a received wake-on-LAN payload within the subnet. For example, one or more powered on network devices 32 can receive a unicast transmission of a wake-on-LAN message. In response, a wake-on-LAN message can be broadcast within the subnet by one or more of the powered on network devices 32, which effectively circumvents the problem of routers dropping global broadcasts. However, while functional, the proxy model has several disadvantages including the requirement of vendor software, the installation of the vendors network devices' agent across the enterprise, the necessity of dedicated network devices 32 to remain powered on, and the failure issues when the agent is down or otherwise unreachable. In addition, enterprises with many small subnets may find leaving one or two network devices 32 active (e.g., per subnet) can significantly diminish their energy savings of reducing energy consumption for network devices 32 (e.g., to sleep during off peak hours).

The architecture of FIG. 1 can overcome these shortcomings (and others) in leveraging a network element (e.g., a switch) to be utilized as a local broadcaster for a request to change power states (e.g., a wake-on-LAN request). In at least one sense, the network element (e.g., a switch, a router, a gateway, etc.) receiving the message can have responsibility for one or more network devices for which the message was intended (e.g., the network element has an association with the network device, has a relationship with the network device, has been entrusted to manage the network device, has a geographical congruency with the network device, shares some commonality with device, has been assigned power management for the network device, shares a subnet with the network device, etc.).

In more specific instances, this can involve using a command-line interface (CLI), a simple network management protocol (SNMP), or other available management application programming interfaces (APIs). These mechanisms allow controller 20 to transmit a change power state request for network device(s) 32 to switch 34, which can then locally broadcast a change power state request to network device(s) 32 in a local subnet 18 assigned to switch 34. [Note that more than one subnet 18 may be assigned to switch 34].

In another example embodiment, a network domain of devices may use a protocol (e.g., an EnergyWise protocol) to transmit a change power state request based on a MAC address (or other addresses) to switches 34 residing in the network domain. Each switch 34, after checking certain filter criteria, can locally broadcast the change power state request to network device(s) 32 in the local subnet(s) assigned to switch 34. In this example, network device(s) 32 matching the MAC address(es) in the change power state request would be awoken. Additionally, filter criteria can be specified to narrow the broadcasts (e.g., anywhere from each of network devices 32 in the domain, to a single network device specific to the switch). This feature would effectively allow a change power state request to be tunneled over the underlying protocol (e.g., EnergyWise protocol).

In yet another example embodiment, a network domain of devices may use a protocol (e.g., EnergyWise protocol) to transmit multiple change power state requests based on selection criteria that does not include a MAC address. For example, the selection criteria may include all network devices 32 in a specific department or all network devices 32 that are at (or above) a security level. In this model, the MAC address of the network device(s) matching the selection criteria can be determined by switch 34.

For example, if the selection criteria includes network devices above a certain security level, then the switch can determine the MAC address for the network devices assigned to the switch that are above the certain security level. In this manner, one or more network devices can be requested to change power states with a single filter criterion. The network domain of devices may include controller 20. While controller 20 can initiate the request, controller 20 does not necessarily need to know the MAC address of network devices 32, or which switches 34 are assigned to each network device 32.

In operation, the architecture of energy management system 10 allows for the management of network devices (e.g., personal computers (PCs)) connected to switches, wireless access point, etc. using the network to monitor, control, and (ultimately) save energy. The architecture has the ability to issue, distribute, and deliver change power state requests (e.g., wake-on-LAN messages) throughout energy management system 10. Any of the components of energy management system 10 can readily communicate a broadcast message that requests certain network devices to shift from one power state to another power state. This broadcast message can be triggered based on specific policies, based on administrator preferences/provisioning, based on cost considerations, etc. No that as used herein in this Specification, the broad term 'message' is inclusive of the previously mentioned items (e.g., requests to change power state) and any other suitable network message that can be communicated from one location to another. The actual message can be received, and then forwarded (in its entirety, or at least a part of the message) based on certain criteria, as discussed herein.

Consider an example campus network deployment, where users are not using their network devices 32 (e.g., at night). If a message is received for network devices to enter into low power state (e.g., a message indicating network devices 32 should enter into a hibernation state), a broadcast message can be communicated to each network device, where the broadcast message is requesting/instructing the network devices to shift from a normal operating state to a hibernation state. This would reduce the power being consumed over this time interval.

Switch 34 is configured to send out appropriate messages to network devices 32, to selected network devices 32, to selected groups of network devices 32, etc. in order to instruct them that they should switch power states. In one particular example, the network devices are configured to interpret the broadcast messages such that network devices 32 can readily switch power states. In certain implementations, the broadcast messages received by network devices 32 can include an assigned time interval for the network devices to remain in the power state. Additional instructions can indicate particular states for transitioning from the power state (e.g., transitioning to a normal operating state after being in a hibernation state for the requisite time interval).

Management applications 12 can communicate with designated network devices 32 using various communication protocols. In one example, the communication is delivered over a wired network. In other instances, a wireless access point can deliver the communication wirelessly via management frames in a corresponding 802.11 message. Note that in particular use cases, an Energy Efficient Ethernet protocol (e.g., IEEE 802.3az) can be involved in such messaging. Other protocols can include proprietary mechanisms, unicasting activities, multicasting activities, simple TCP/IP communications, user datagram protocol (UDP) communications, appropriate discovery protocols, etc.

In one example operation, demand response broadcast messages instruct the devices to shift into different power states. In particular implementations involving personal computers, the broadcast message can include a Windows™ PowerCfg command, which instructs a network device to switch power states. Moreover, existing protocols in network devices can be used as a mechanism to affect the power state change. For example, 'Desktop and mobile Architecture for System Hardware' (DASH) and vPro (e.g., in Intel environments) can be leveraged to achieve this activity. In other instances, Windows Management Instrumentation (WMI) could be leveraged for initiating the change. WMI is simply an API in the Windows operating system that enables devices and systems in a network (e.g., typically enterprise networks) to be managed and controlled. Often utilizing common information model (CIM), WMI allows network administrators to query and manage workstations, applications, networks, etc.

Operationally, network devices 32 are configured to enter into a different power state based on any number of potential options. For example, one option may be associated with a timeout message provided in the request to switch power states. The message would indicate, for example, to switch to a hibernation state for the next four hours. Another option would involve a second message sent to instruct network devices 32 to enter into a new power state (e.g., a normal operational power state after being in a hibernation state). Still other options can involve default-timing mechanisms (specific to each network device 32) such that network devices 32 would automatically shift to their normal power state after some predefined time interval (e.g., 60 minutes, etc.).

Note that certain infrastructure may be aware of whether network devices 32 have the option of changing power states. For example, in an EnergyWise™ domain, the switch to which network devices 32 are connected would know that each network device 32 has several different power states (power options). Other mechanisms for knowing the power state options of network devices 32 (before the power state change signals are sent) can involve simple provisioning by an administrator, discovery mechanisms when network devices 32 come online, querying activities involving individual network devices 32, etc. The different power states may include a normal operating power state, a reduced or low power state, a hibernation power state, etc.

A number of advantages can be achieved by the architecture of energy management system 10. For example, the architecture is configured to intelligently control power from the network perspective. Hence, the architecture of energy management system 10 allows network and network-attached equipment to take advantage of a configuration that includes no central processing and no central repository. Such a configuration also offers the advantage of having no single point of failure. The group devices of a cloud (i.e., the network) can be self-managed, where there is no central control. Controller 20 can be representative of a single computing device, which could be provisioned virtually anywhere in the network, or a plurality of controllers 20 can be provisioned at strategic locations in the network, as further described below.

Separately, the configuration of energy management system 10 is protocol agnostic, where various communication transports can be used. The architecture also fosters cloud computing to be done to a variable number of entities (all of which may have different types of ASICS, OSs, etc.). Dynamically, network devices 32 can join and leave the heterogeneous environment, where various types of network devices 32 can be readily managed by energy management system 10.

As a stand-alone solution, energy management system 10 enables businesses to monitor and to control the electric consumption of networking equipment. An administrator can monitor devices like switches and routers, as well as LAN switch connected Power over Ethernet (PoE) devices such as phones, access points, IP security cameras, door access equipment, etc. Energy management system 10 also has the ability to monitor and to control the energy demands of AC powered devices such as smart power distribution units, networked building systems, office equipment, etc. Energy management system 10 also includes an open interface to allow 3rd party management systems to participate in the framework. This simplifies integration of power reporting and automation for existing business practices.

Briefly discussing some of the possible signaling mechanisms of the architecture, the system of FIG. 1 can leverage a simple network management protocol (SNMP) and a secure socket layer (SSL) protocol [as part of a management application program interface (API)] to execute any of the functions of the present disclosure. Management applications 12 can be tailored for particular facilities, or configured for specific IT scenarios. Management applications 12 can also be configured to correlate power data with location, and then allocate power accordingly. Switches and routers can readily communicate through a management API, where the network can aggregate status and power information. In terms of a client protocol mechanism, this element can communicate status and receive policies.

In regards to the management API for management applications 12, there can be several methods for a management application to communicate with the network (e.g., SNMP, SSL, etc.). A management information base (MIB) can be available on each enabled network device and, further, can include power usage, power policy, alarms, etc. The MIB can also provide per-device information. Network management systems interested in a network-wide query can use the SSL interface. The SSL interface can allow a single switch to query/set information from/to certain switches in a domain.

Figure 2A:
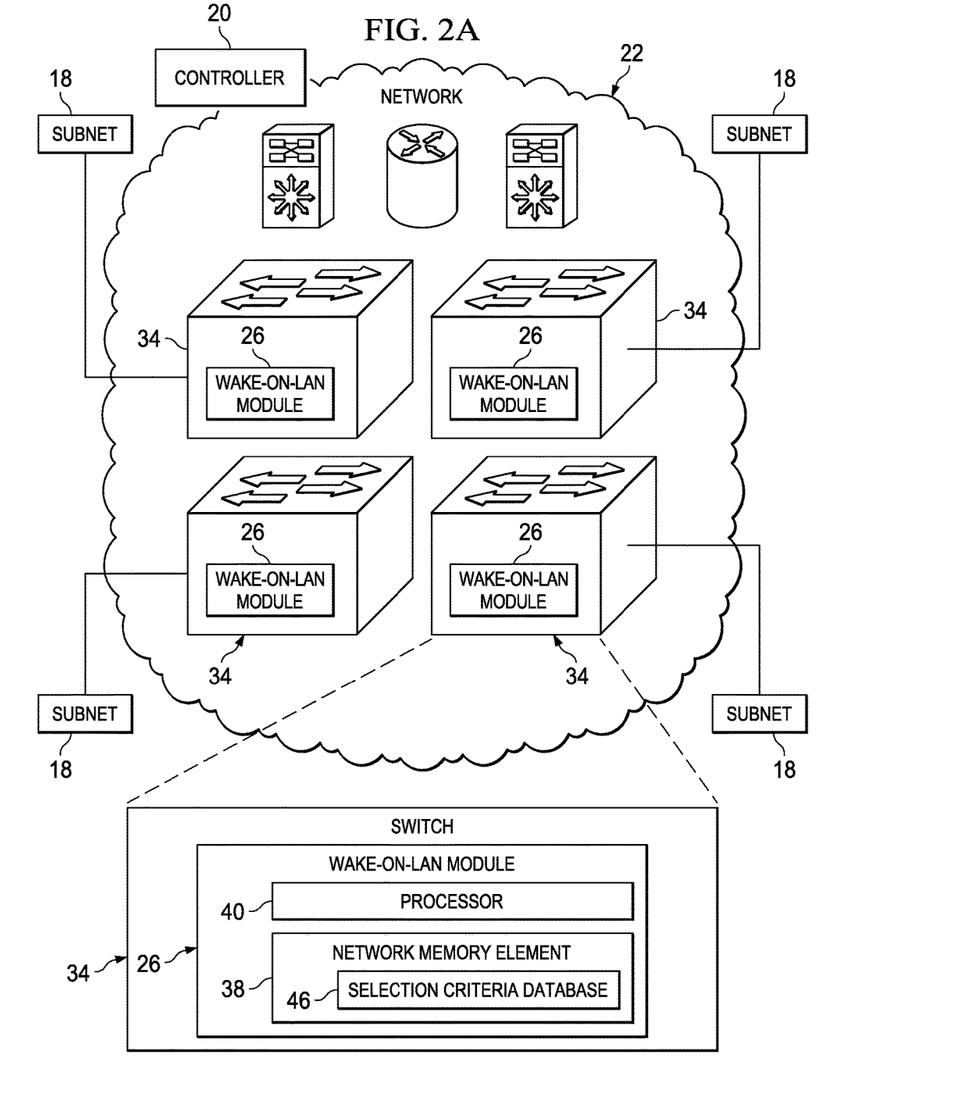
FIG. 2A is a simplified block diagram illustrating possible example details associated with one embodiment of the present disclosure.

Turning to FIG. 2A, FIG. 2A is a simplified block diagram illustrating one possible set of details associated with energy management system 10. FIG. 2A includes controller 20, network 22, switches 34, and subnets 18, which may include one or more network devices (not shown for purposes of simplicity). Each switch 34 may include an instance of wake-on-LAN module 26 to communicate change power state requests to network devices 32. Wake-on-LAN module 26 may include a processor 40 and a network memory element 38, which may include a selection criteria database 46.

Members of subnets 18 may include switches, routers, network controllers, gateways, network appliances, or any other suitable network infrastructure, which make up the data network proper (as well as network devices 32 not shown). Subnets 18 are much like a community in network management, where each subnet 18 can form a unit of power management. Hence, subnets 18 can be viewed as a logical group of entity devices. Additionally, managers (e.g., control applications) can be used to measure, monitor, and/or manage power consumption.

In terms of relationships, subnet 18 members (e.g., the switches and the routers) can operate as "neighbors" while establishing "parent-child" relationships with network devices in each subnet 18. Keywords can be used to tag devices in subnet 18 with labels to filter searches or queries. The keywords can be stored in selection criteria database 46 of switch 34 (or at any other suitable location), where these keywords can be used to identify specific devices or groups of devices with common attributes (e.g., devices in a building lobby, related to security, etc.). The actual queries can determine energy usage, set power levels and/or power states across the network. The actual power level can indicate the power state of an entity. In regards to importance (priority), devices can be differentiated by how they would be affected by power state changes. For example, critical devices (e.g., stairway lighting, HVAC, fire alarms, etc.) would have a higher priority than noncritical devices (e.g., charging laptops, courtesy phones provided a lobby, etc.).

Additionally, policies can be set with a network-based query to make power state changes (e.g., return all devices on the first three floors of a building to a normal operating state at 7:00 a.m.). The network query can be initiated by controller 20, sent to one or more switch(s) 34, and then propagated across subnet(s) 18, which contain the devices that satisfy the network query.

The ability to create tags or keywords is available in energy management system 10, and these can be used to improve the search capability of a network-based query. Any arbitrary set of keywords can be defined per port, per network device, per subnet, or using any other suitable criteria. For example, a given client such as a PC can have specific keywords stored within the device such that, as the client moves between ports or subnets 18, the keywords can follow the device.

In an embodiment, controller 20 may determine which devices in each subnet 18 should change power states. Controller 20 can send a change power state request to each switch 34. Each switch 34 can then locally broadcast the change power state request to each device (in subnet 18) that is associated with the switch. Controller 20 does not need to know which devices (or how many devices) are in each subnet 18 because that information can be managed elsewhere (e.g., by wake-on-LAN module 26).

In another embodiment, controller 20 may determine that a specific subnet or a specific device in a subnet should change power state. Controller 20 can then send a change power state request to each switch 34, where the change power state request can include a specific MAC address, or set of MAC addresses. After receiving the change power state request, each switch 34 can determine if the MAC address matches a MAC address in selection criteria database 46 for switch 34. If the MAC address matches a MAC address in selection criteria database 46, then switch 34 can locally broadcast the change power state request to the device that is associated with the MAC address. A device matching the MAC address in the change power state request can receive the change power state request from switch 34.

In another embodiment, controller 20 may determine that a specific group of devices should change power state. Controller 20 can then send a change power state request to each switch 34, where the change power state request includes certain filter criteria (e.g., only devices that are non-essential devices should change power state, only devices that are located on a certain floor of a building should change state, etc.). Each switch 34 can then determine if the filter criteria matches data in selection criteria database 46. Switch 34 can locally broadcast the change power state request to the devices in subnet 18 that match the filter criteria. Controller 20 does not need to know the MAC address of the devices, or where the devices are located in the network, or which switches control the devices that should change power state. If the filter criteria matches filter criteria in selection criteria database 46 in switch 34, then the switch would determine the MAC address of the network device(s) that should receive the change power state request.

Controller 20 can maintain any number of data (e.g., tables, lists, policies, etc.) that can be used in the management of the architecture. For example, the data can reveal a given network device's identification or ID, the network device's role, the domain of the network device, the importance/priority of the network device, the current state of the network device, a respective management interface for the network device, any keywords or filter criteria associated with the network device, etc.

Power policies can be sent to each switch 34, where the policies can be propagated to individual network devices. For example, a policy could be propagated to switches 34 to indicate to shut down phones in a building at 8 PM. Another example could involve moving HVAC systems to certain levels after the workday has concluded. Another example could involve switching to a hibernation state for all PCs during a lunch hour (e.g., 12 PM-1 PM).

In one example implementation, controller 20 and/or wake-on-LAN module 26 can include software to facilitate energy management operations. For example, controller 20 and/or wake-on-LAN module 26 may include software that is configured to intelligently evaluate an opportune time for sending broadcast messages to the network devices for switching between power states. In example embodiments, network access can be leveraged to offer the capability for an end user to control energy parameters in a given domain.

Controller 20 is a network element configured to interact with switches 34 in order to manage energy usage of network devices 32 in energy management system 10. Note that controller 20 can readily be part of a server in certain embodiments of this architecture, or provisioned in conjunction with management applications 12, or provisioned in any other suitable device or network location. As used herein in this Specification, the term 'network element' is meant to encompass proprietary devices, servers, network appliances, routers, switches, management appliances, gateways, bridges, loadbalancers, firewalls, processors, modules, or any other suitable device, note, proprietary component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Software for providing intelligent energy management functionalities can be provided at various locations. In one example implementation, this software is resident in a network element (e.g., provisioned in controller 20, wake-on-LAN module 26, etc.). In other examples, this could involve combining domain devices, controller 20 and/or switch 34 with an application server, a firewall, a gateway, or some proprietary element, which could be provided in (or be proximate to) these identified network elements, or this could be provided in any other device being used in a given network. In other embodiments, each network device 32, switch 34 (inclusive of wake-on-LAN module 26), and/or each instance of controller 20 may include any suitable algorithms, hardware, software, components, modules, interfaces, or objects that facilitate these energy management operations. This may be inclusive of appropriate communication protocols that allow for the effective exchange of data or information for achieving energy management in a network environment.

Logistically, certain items or elements can be provisioned for the intelligent energy management system to function. For example, network devices 32 can include an agent (for example, in software) that allows network devices 32 to respond to broadcast messages from the network. Note that the term 'broadcast message' as used herein in this Specification is meant to encompass any type of signaling, packet information, messaging, short message service (SMS) communications, instant messaging (IM), e-mail protocols, or any other message type that can be delivered to a network device such that it understands to switch between available power states. In still other embodiments, the energy management features may be provided externally to controller 20, switch 34, and/or network devices 32, or included in some other network device, or in a computer to achieve these intended functionalities.

Figure 2B:
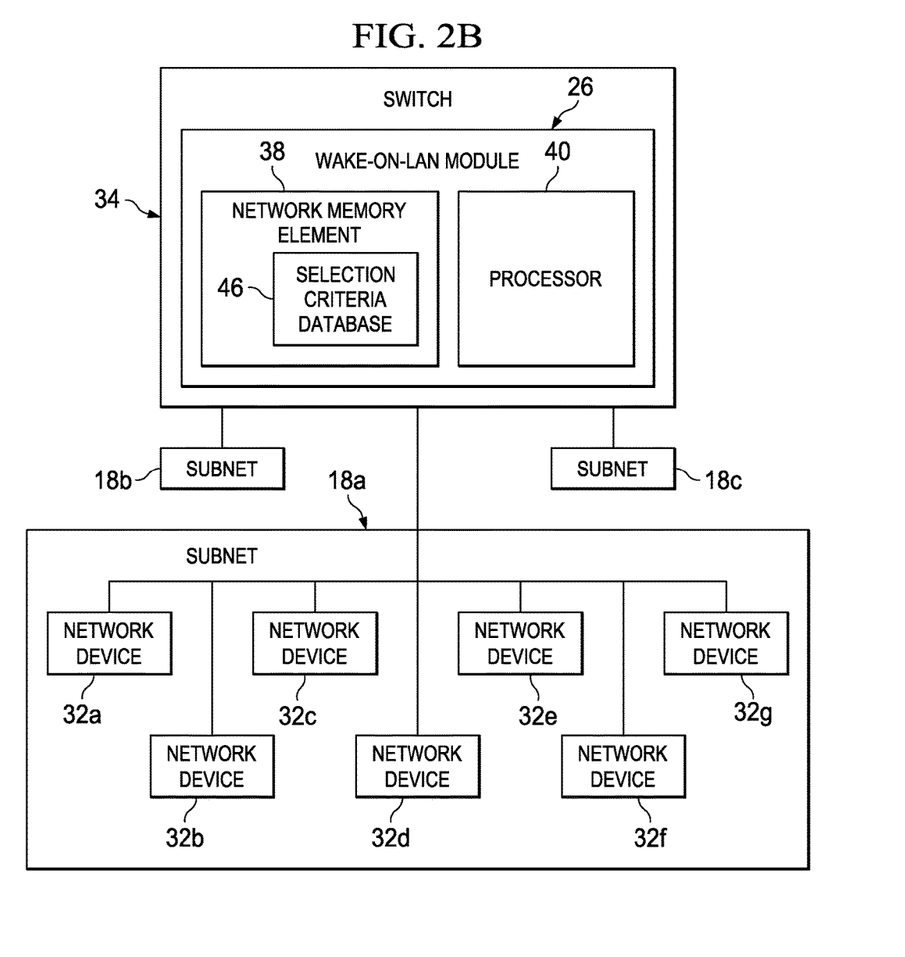
FIG. 2B is a simplified block diagram illustrating possible example details associated with one embodiment of the present disclosure.

Turning to FIG. 2B, FIG. 2B is a simplified block diagram illustrating one possible set of details associated with energy management system 10. FIG. 2B includes a number of subnets 18a-c, which are coupled to switch 34. Each of subnets 18a-c can include any number of network devices 32a-g (with accompanying infrastructure) provisioned in any suitable computing environment. Using selection criteria database 46, switch 34 can determine which network devices 32a-g are associated with switch 34, specific keywords associated with each network device 32a-g, the MAC address of each network device 32a-g, etc. Energy management system 10 is configured to leverage the network to enable monitoring and controlling of connected network devices 32a-g through switch 34. The architecture allows the network to form a control plane for energy management and, further, offers IT organizations a tool for managing energy more effectively.

Network devices 32a-g are representative of power consumers of any kind. For example, network devices 32a-g can be representative of PoE and non-PoE devices that can connect to the network. Further, network devices 32a-g can include nontraditional network devices such as facility controllers, lighting, heating ventilation, and air conditioning (HVAC), etc. The term 'network device' can also be inclusive of devices used to initiate a communication, such as a switch, a console, a proprietary endpoint, a telephone, a bridge, a computer, a personal digital assistant (PDA), a laptop or electronic notebook, an i-Phone, an iPad, a Google Droid, any other type of smartphone, a Telepresence system, an access point, a router, a switch, a gateway, a server, or any other device, component, element, or object capable of facilitating voice, audio, or data exchanges within energy management system 10.

Network devices 32a-g may also be inclusive of a suitable interface to an end user, such as a microphone, a display, or a keyboard or other terminal equipment. Network devices 32a-g may also include any device that seeks to initiate a communication on behalf of another entity or element, such as a program, a database, or any other component, device, element, or object capable of initiating a voice or a data exchange within energy management system 10. Data, as used herein, refers to any type of video, numeric, voice, packet, or script data, or any type of source or object code, or any other suitable information in any appropriate format that may be communicated from one point to another.

It should be noted that there are various protocols that can change the energy state for a device (e.g., wake-up the device). For example, example network protocols can include WakeOnLan, DASH, SMASH, and VPRO. Separately, example non-network protocols can include toggling power on a PoE port, PDU plug, and a virtual circuit breaker. In operation, a switch or management station could determine which protocol to use to wake up a device (e.g., based on which protocol(s) the device supports).

The architecture of the present disclosure can use a WakeOnNetwork protocol, which refers to the device capability to support protocols such as WakeOnLan, SMASH, DASH, VPRO, or other protocols, that effectively change energy state (e.g., wake-up a device) such that the device transitions from a non-operational to an operational state. Operational and non-operational levels can be defined by power levels 0-10. Non-operational state could be, for example, 0 shut off, 1 hibernate, 2 sleep. In addition, operational states could be, for example, 3 standby, 4 ready, 5 low, 6 frugal, 7 medium, 8 reduced, 9 high, 10 full.

In specific implementations of the presence disclosure, discovery packets received from endpoints can contain a WakeOnNetwork (WoN) capability vector that indicates which types of WoN protocols it supports. This data can be stored by the switch for each endpoint. Based on the device's WakeOnNetwork capability vector (and other configurable parameters), the switch can compose a WoN packet. Separately, the switch can use the cached MAC address, and send the WoN packet to the device.

A given device can be configured to inform the switch which protocol(s) are supported and, based on this information, the switch can compose the appropriate packet, or other mechanisms to change the energy state of the device. The device can provide configurations in addition to the WoN capability vector. The device can also provide a UDP port number to be used when the switch transmits WoN packets. In addition, the device may provide values for certain power levels that are relevant to WoN, such as maximum non-operational level, and minimum operational level. Such levels can be used to determine if WakeOnNetwork is indicated for a particular situation.

Figure 3:
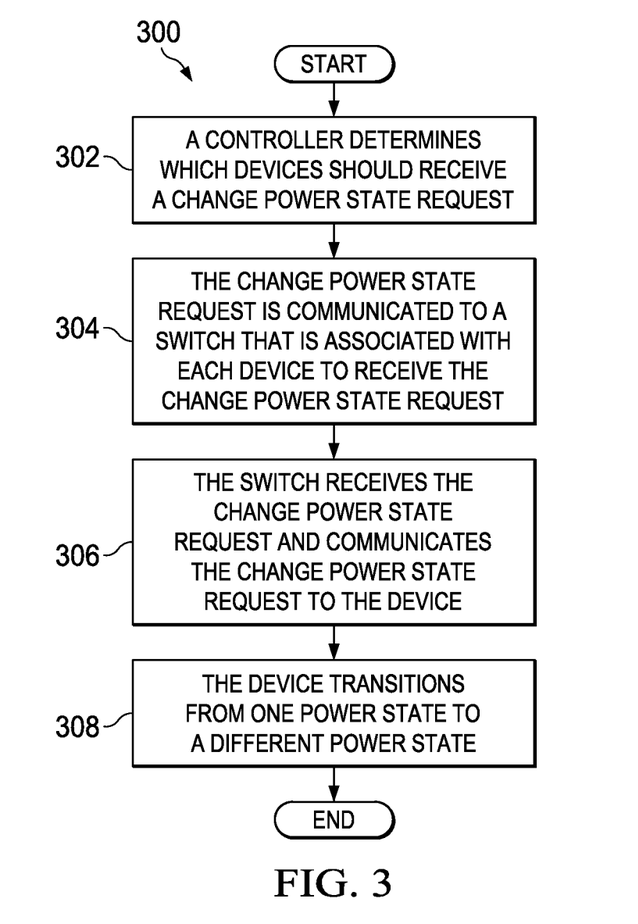
FIG. 3 is a simplified flow diagram illustrating potential operations associated with one embodiment of the present disclosure.

FIG. 3 is a simplified flowchart 300 illustrating example activities of network enabled energy management provisioning for a device. At 302, a network domain controller determines which devices associated with a subnet should receive a change for a power request. For example, controller 20 may determine which network devices 32 should receive a change power state request. At 304, the change of power request can be communicated to a switch, which is associated with each device that is to receive the change power state request. For example, controller 20 may communicate the change in power request to switch 34. At 306, the switch receives the change power state request and communicates the change power state request to the device. For example, switch 34 may communicate the change of power request to each network device 32 in subnet 18. At 308, the device can transition from one power state to a different power state (e.g., a non-operable state to an operable state).

Figure 4:
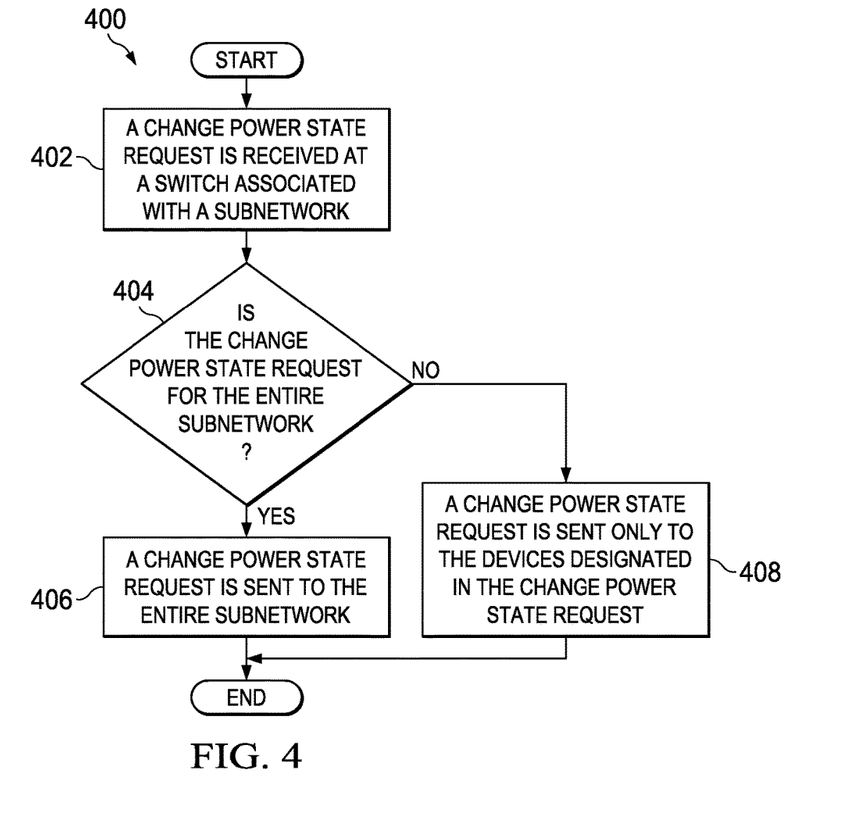
FIG. 4 is a simplified flow diagram illustrating potential operations associated with one embodiment of the present disclosure.

FIG. 4 is a simplified flowchart 400 illustrating example activities of network-enabled energy management provisioning for a device. At 402, a change power request is received at a switch associated with a subnet. For example, switch 34 may be associated with subnet 18 and receive a switch power request from controller 20. At 404, the system determines if the change power request is for the entire subnet. For example, switch 34 may determine if the change power request is for the entire subnet 18. If the change power request is for the entire subnet, then a change power request is sent to the entire subnet, as illustrated in 408. If the change power request is not for the entire subnet, then a change power request is sent to the devices designated in the change power request, as illustrated in 408. For example, switch 34 may send the change power request to only network devices 32 designated in the change power request (or switch 34 may use priority characteristics to determine a subset of network devices for which the message should be sent).

Figure 5:
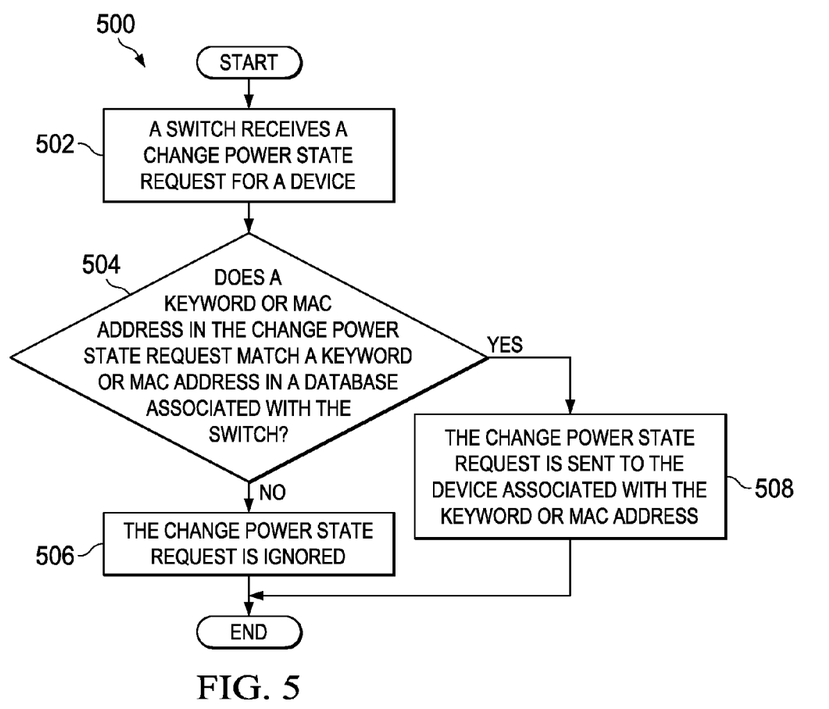
FIG. 5 is a simplified flow diagram illustrating potential operations associated with one embodiment of the present disclosure.

FIG. 5 is a simplified flowchart 500 illustrating example activities of network-enabled energy management provisioning for a device. At 502, a switch receives a change power request for a device. For example, switch 34 may receive a change power request from controller 20. At 504, the system determines if a keyword or MAC address in the change power request matches a keyword or MAC address in a database associated with the switch. For example, switch 34 may determine if a keyword or MAC address in the change power request matches a keyword or MAC address in selection criteria database 46. If the keyword or MAC address does not match a keyword or MAC address in the database associated with the switch, then the change power request is ignored, as illustrated in 506. If the keyword or MAC address matches a keyword or MAC address in the database associated with the switch, then the change power request is sent to the device associated with the keyword or MAC address, as illustrated in 508. For example, based on the keyword or MAC address in the change power request matching information in selection criteria database 46, specific network devices 32 may be identified, and the change power request can be communicated to the identified network devices 32.

As identified previously, a network element can include software to achieve the energy management operations, as outlined herein in this document. In certain example implementations, the energy management functions outlined herein may be implemented by logic encoded in one or more non-transitory tangible media (e.g., embedded code provided in an application specific integrated circuit [ASIC], digital signal processor [DSP] instructions, software [potentially inclusive of object code and source code] to be executed by a processor [processor 40 shown in FIGS. 2A and 2B], or other similar machine, etc.). In some of these instances, a memory element [network memory element 38 shown in FIGS. 2A and 2B] can store data used for the operations described herein. This includes the memory element being able to store code (e.g., logic, software, or processor instructions) executed to carry out the activities described in this Specification. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the energy management activities as outlined herein. Additionally, each of these devices may include a processor that can execute software or an algorithm to perform the energy management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., a database) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note the previous examples can involve identifying peak power times in smoothing or time shifting the power usage in a given environment. For example, a management application can monitor power consumption and receive a peak power alert. A policy can be created to minimize this peak consumption by leveraging power states. Part of this policy may include identifying eligible phones, laptops, and building HVAC systems that could be candidates for shifting to a low power state or hibernation state. For example, in the context of these identified devices, a laptop could move to hibernation, eligible phones could also move to a low power state, printers could move to a sleep mode or hibernation state.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that energy management system 10 (and its teachings) are readily scalable and, further, can accommodate a large number of components, as well as more complicated/sophisticated arrangements and configurations. Accordingly, the examples provided should not limit the scope or inhibit the broad teachings of energy management system 10, as potentially applied to a myriad of other architectures.

It is also important to note that the steps in the preceding FIGURES illustrate only some of the possible scenarios that may be executed by, or within, energy management system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by energy management system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain protocols (e.g., UDP, SSL, SNMP, etc.), energy management system 10 may be applicable to other exchanges and protocols in which data are exchanged in order to provide energy management operations. In addition, although energy management system 10 has been illustrated with reference to particular elements and operations that facilitate the communication process, these elements and operations may be replaced by any suitable architecture or process that achieves the intended functionality of energy management system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a broadcast message indicative of a request to change a power state of at least one network device of a plurality of network devices associated with a domain, the broadcast message including at least one filtering criterion;
   comparing the at least one filtering criterion included in the broadcast message with a database of criteria;
   determining whether the at least one filtering criterion included in the broadcast message matches a criterion included in the database of criteria;
   upon determining that the at least one filtering criterion matches a criterion in the database:
   identifying, based on the comparing, particular network devices of the plurality of network devices associated with the domain that are: (i) capable of switching from a first power state to a second power state, and (ii) associated with the matched criterion; and
   communicating the broadcast message to the identified particular network devices indicative of the request to change a power state for at least one of the particular network devices to switch from the first power state to the second power state;
   upon determining that the at least one filtering criterion fails to match a criterion in the database: ignoring the request to change a power state of at least one network device; and
   wherein the at least one filtering criterion includes a keyword identifying a common attribute among a subset of the particular network devices.

2. The method of claim 1, wherein the broadcast message includes a timer interval for the at least one network device to remain in the second power state.

3. The method of claim 1, further comprising:
   communicating a second broadcast message to the particular network devices indicative of a request for the at least one of the particular network devices to switch to the first power state.

4. The method of claim 1, wherein a discovery mechanism is used in order to identify which of the plurality of network devices are capable of switching from a first power state to a second power state.

5. The method of claim 1, wherein the at least one filtering criterion includes an identifier associated with the at least one network device.

6. The method of claim 1, wherein the at least one filtering criterion includes a power level of the at least one network device.

7. The method of claim 1, wherein the at least one network device includes an endpoint.

8. Logic encoded in non-transitory media that includes code for execution and when executed by a processor operable to perform operations comprising:
   receiving a broadcast message indicative of a request to change a power state of at least one network device of a plurality of network devices associated with a domain, the broadcast message including at least one filtering criterion;
   comparing the at least one filtering criterion included in the broadcast message with a database of criteria;
   determining whether the at least one filtering criterion included in the broadcast message matches a criterion included in the database of criteria;

upon determining that the at least one filtering criterion matches a criterion in the database:
identifying, based on the comparing, particular network devices of the plurality of network devices associated with the domain that are: (i) capable of switching from a first power state to a second power state, and (ii) associated with the matched criterion; and
communicating the broadcast message to the identified particular network devices indicative of the request to change a power state for at least one of the particular network devices to switch from the first power state to the second power state;
upon determining that the at least one filtering criterion fails to match a criterion in the database: ignoring the request to change a power state of at least one network device; and
wherein the at least one filtering criterion includes a keyword identifying a common attribute among a subset of the particular network devices.

9. The logic of claim 8, wherein the broadcast message includes a timer interval for the at least one network device to remain in the second power state.

10. The logic of claim 8, the operations further comprising:
communicating a second broadcast message to the particular network devices indicative of a request for the at least one of the particular network devices to switch to the first power state.

11. The logic of claim 8, wherein a discovery mechanism is used in order to identify which of the plurality of network devices are capable of switching from a first power state to a second power state.

12. The logic of claim 8, wherein the at least one filtering criterion includes an identifier associated with the at least one network device.

13. The logic of claim 8, wherein the at least one filtering criterion includes a power level of the at least one network device.

14. The logic of claim 8, wherein the at least one network device includes an endpoint.

15. An apparatus, comprising:
a memory element configured to store electronic code;
a processor operable to execute instructions associated with the electronic code; and
a module operable to interface with the processor such that the apparatus is configured for:
receiving a broadcast message indicative of a request to change a power state of at least one network device of a plurality of network devices associated with a domain, the broadcast message including at least one filtering criterion;
comparing the at least one filtering criterion included in the broadcast message with a database of criteria;
determining whether the at least one filtering criterion included in the broadcast message matches a criterion included in the database of criteria;
upon determining that the at least one filtering criterion matches a criterion in the database:
identifying, based on the comparing, particular network devices of the plurality of network devices associated with the domain that are: (i) capable of switching from a first power state to a second power state, and (ii) associated with the matched criterion; and
communicating the broadcast message to the identified particular network devices indicative of the request to change a power state for at least one of the particular network devices to switch from the first power state to the second power state;
upon determining that the at least one filtering criterion fails to match a criterion in the database: ignoring the request to change a power state of at least one network device; and
wherein the at least one filtering criterion includes a keyword identifying a common attribute among a subset of the particular network devices.

16. The apparatus of claim 15, wherein the broadcast message includes a timer interval for the at least one network device to remain in the second power state.

17. The apparatus of claim 15, wherein the apparatus is further configured for:
communicating a second broadcast message to the particular network devices indicative of a request for the at least one of the particular network devices to switch to the first power state.

18. The apparatus of claim 15, wherein a discovery mechanism is used in order to identify which of the plurality of network devices are capable of switching from a first power state to a second power state.

19. The apparatus of claim 15, wherein the at least one filtering criterion includes an identifier associated with the at least one network device.

20. The apparatus of claim 15, wherein the at least one filtering criterion includes a power level of the at least one network device.

* * * * *